US006959107B2

(12) United States Patent
Kasai

(10) Patent No.: US 6,959,107 B2
(45) Date of Patent: Oct. 25, 2005

(54) RADIATION IMAGE PROCESSING APPARATUS AND CASSETTE FOR STORING RADIATION IMAGE

(75) Inventor: Satoshi Kasai, Hino (JP)

(73) Assignee: Konica Corporation, Tokyo (JP)

( * ) Notice: Subject to any disclaimer, the term of this patent is extended or adjusted under 35 U.S.C. 154(b) by 696 days.

(21) Appl. No.: 10/039,344

(22) Filed: Dec. 31, 2001

(65) Prior Publication Data

US 2002/0057829 A1 May 16, 2002

(51) Int. Cl.$^7$ .............................................. G06K 9/00
(52) U.S. Cl. ..................................................... 382/131
(58) Field of Search ................................ 382/128, 129, 382/130, 131, 132; 250/370.09, 271, 390.02, 581, 582, 583, 584; 378/4, 21, 22, 54, 62, 63, 182; 430/5, 6, 21; 348/77, 162; 702/40

(56) References Cited

U.S. PATENT DOCUMENTS

| | | | | |
|---|---|---|---|---|
| 4,809,308 A | | 2/1989 | Adams et al. | ............. 378/98.2 |
| 4,837,686 A | * | 6/1989 | Sones et al. | .................. 378/18 |
| 4,941,164 A | * | 7/1990 | Schuller et al. | ............. 378/205 |
| 4,499,497 A | | 3/1991 | Funahashi et al. | .......... 348/300 |
| 4,999,497 A | * | 3/1991 | Funahashi et al. | .......... 250/587 |
| 5,297,036 A | | 3/1994 | Grimaud | ...................... 382/132 |
| 5,506,880 A | * | 4/1996 | Scardino et al. | ........... 378/98.2 |
| RE35,423 E | * | 1/1997 | Adams et al. | ................. 378/58 |
| 5,600,574 A | * | 2/1997 | Reitan | ......................... 702/185 |
| 5,696,805 A | | 12/1997 | Gaborski et al. | ............. 378/54 |
| 6,320,931 B1 | * | 11/2001 | Arnold | ......................... 378/56 |
| 6,510,197 B1 | * | 1/2003 | Mitchell et al. | .............. 378/62 |

FOREIGN PATENT DOCUMENTS

EP     0 314 506 A1    5/1989    ............ A61B/6/14

OTHER PUBLICATIONS

Yin, Fang–Fang et al, "Computerized detection of masses in digital mammograms: Automated alignment of breast images and its effect on bilateral–substraction technique," Med. Phys. vol. 21 No. 3, Mar. 1994, pp. 445–452.

Matsumoto, Kazuio et al, "Detection Method of Maignant Tumors in DR Images—Iris Filter–," Trans. Inst. Electron. Inform. Commun. Eng. D–II, vol. J75–DII, No. 3, 1992, pp. 663–670.

Isobe, Yoshiaki et al, "Characteristics of Quoit Filter, a Digital Filter Developed for the Extraction of Circumscribed Shadows, and its Applications to Mammograms," Trans. Inst. Electron. Inform. Commun. Eng. D–II, vol. J76–D–II, No. 3, 1993, pp. 279–287.

(Continued)

Primary Examiner—Andrew W. Johns
Assistant Examiner—Shervin Nakhjavan
(74) Attorney, Agent, or Firm—Frishauf, Holtz, Goodman & Chick, P.C.

(57) ABSTRACT

The invention concerns radiation image processing apparatus and cassettes for storing a radiation image. The apparatus includes a pixel-value analyzing section to analyze a pixel-value within a step pattern of a wedge area in which a density varies step by step, wherein the radiation image includes the wedge area; and a suspicious region analyzing section to detect a candidate of a suspicious region by using information outputted from the pixel-value analyzing section. Further, the suspicious region analyzing section includes a gradation-adjusting section to adjust a gradation of the radiation image on the basis of information, pertaining to the pixel-value, outputted by the pixel-value analyzing section. In addition, the suspicious region analyzing section also includes a parameter-adjusting section to adjust a parameter for detecting the candidate of the suspicious region on the basis of information, pertaining to the pixel-value, outputted by the pixel-value analyzing section.

15 Claims, 4 Drawing Sheets

OTHER PUBLICATIONS

Shimizu, Akinobu et al, "Minimum Directional Difference Filter for Extraction of Circumscribed Shadows in Chest X–Ray Images and its Characteristics," Trans. Inst. Electron. Inform. Commun. Eng. D–II, vol. J76–D–II, No. 2, 1993, pp. 241–249.

Spiesberger, Wolfgang, "Mammogram Inspection by Computer," IEEE Trans. Biomed Eng BME–26 (4), 1979, pp. 213–219.

Jin, Hua–Pong et al, "Extraction of Microcalcifications on Mammogram Using Morphological Filter with Multiple Structuring Elements," Trans. Inst. Electron. Inform. Commun. Eng. D–II, vol. J71–D–II, No. 7, 1992, pp. 1170–1176.

Matsubara, Tomoko et. al, "A Classification Scheme for Mammograms Based on the Evaluation of Fibroglandular Breast Tissue Density," Medical Electronics and Biomedical Engineering, vol. 38 No. 2, 2000, pp. 93–101.

Doi, K. et al., "Utilization of Digital Image Data for Computer–aided Diagnosis," Image Management and Communication in Patient Care, 1989. Implementation and Impact., First International Conference on Washington, DC, USA Jun. 4–8, 1989, Los Alamitos, CA, USA, IEEE Comput. Soc., US, Jun. 4, 1989, pp. 128–135, XP010094370, ISBN: 0–8186–1950–3.

Kimme–Smith, C. et al., "A Review of Mammography Test Objects for the Calibration of Resolution, Contrast, and Exposure," Medical Physics, American Institute of Physics, New York, US, Vo. 16, No. 5, Sep. 1, 1989, pp. 758–765, XP000074448, ISSN: 0094–2405.

* cited by examiner

| PIXEL-VALUE OF EACH STEP | PREDETERMINED PIXEL-VALUE |
|---|---|
| D 1 | A 1 |
| D 2 | A 2 |
| D 3 | A 3 |
| D 4 | A 4 |
| D 5 | A 5 |
| ≈ | ≈ |
| D n | A n |

RADIATION IMAGE PROCESSING APPARATUS AND CASSETTE FOR STORING RADIATION IMAGE

BACKGROUND OF THE INVENTION

The present invention relates to radiation image processing apparatus and cassettes for storing a radiation image, and specifically relates to a radiation image processing apparatus and a cassette for storing a radiation image, in which a stepwise variation of density formed on a wedge area of a radiation image is utilized for adjusting a gradation and a suspicious region detecting parameter of the radiation image.

Conventionally, before an image is printed out onto a film or a paper, or displayed on the high-luminance CRT monitor, etc., various kinds of image adjustments, such as manual adjustment of gradation, gradation processing, frequency processing, dynamic-range compression processing, multi-objective frequency processing, etc., are applied to the image data of the image to be outputted.

Mammography has been known as one of reliable methods to detect breast cancer, and recently, frequently introduced into mass examinations. The densities of mammary glands in mammograms widely vary depending on individualities and ages of subjects, and generally, mammary glands of a young lady or a nullipara are very high dense and uniform. However, involution of mammary glands and fatty degeneration advances with the increase of age, resulting in uneven density of mammary glands, which will be finally substituted by adipose tissues. To distinguish the mammary glands from other tissues, the radiation images have been classified into several types.

Further, in case of conventional processes for detecting a suspicious region, the suspicious region detecting means in the film-screen system utilizes image data obtained by digitizing the film image, while that in the digital system utilizes image data inputted from the inputting device as it is.

In order to alleviate the doctor's labor for reading the radiation image and to reduce oversight cases on the doctor's part when the doctor makes diagnosis while viewing a radiation image, processes for detecting a candidate region as a suspicious region by means of a computer have been developed. The methods for detecting a mass shadow and a microcalcification, which are known as major two findings in case of the breast cancer, have been widely proposed. (References with Respect to the Major Two Findings in Case of the Breast Cancer)

1) Mass Shadow

Computerized detection of masses in digital mammography: Automated alignment of breast images and its effect on bilateral-subtraction technique (Med. Phys., Vol. 21. No. 3, 445–452)

Detecting method by employing iris filter (Trans. Inst. Electron. Inform. Commun. Eng. D-11, Vol. J75-D-11, no. 3, pp. 663–670, 1992)

Detecting method by employing Quoit filter (Trans. Inst. Electron. Inform. Commun. Eng. D-11, Vol. J76-D-11, no. 3, pp. 279–287, 1993)

Detecting method by conducting binary-coding operation on the basis of histogram of pixel values of segmented breast regions (Jamit Frontier 95, collection of lectures, pp. 84–85, 1995)

Minimum directive difference components filter for acquiring minimum output from many Laplacian filters having directivity (Trans. Inst. Electron. Inform. Commun. Eng. D-11, Vol. J76-D-11, no. 2, pp. 241–249, 1993)

2) Cluster of Microcalcifications

Method for eliminating quasi-positive candidate regions, on the basis of optical density deference of shadow images, standard deviation values of boundary density deference, etc., by regionalizing a region suspected to be microcalcifications from a breast area (IEEE Trans. Biomed Eng BME-26 (4): 213–219, 1979)

Detecting method by employing images to which Laplacian filtering processing is applied (Trans. Inst. Electron. Inform. Commun. Eng. D-11, Vol. J71-D-11, no. 10, pp. 1994–2001, 1998)

Detecting method by employing images to which morphorgy analysis is applied to suppress influence of background patterns including mammary glands, etc. (Trans. Inst. Electron. Inform. Commun. Eng. D-11, Vol. J71-D-11, no. 7, pp. 1170–1176, 1992)

3) Further, there has published as a thesis in respect to classification of mammary glands: Method for automatically classifying mammograms based on evaluation of density of mammary glands (Japanese Medical Magazine titled "Medical Electronics and Biomedical Engineering" Vol. 38, No. 2, pp. 93–101, 2000)

It has been difficult for a conventional radiation image processing apparatus to output images having a stable gradation characteristic, which, sometimes, varies depending on characteristics of the images, since such the apparatus output each of the images as it is, despite that each of the images was acquired on the different conditions (such as amount of radial rays, voltage applied to radiation tube, screen, film, plate, etc.) or adjust the gradation of each image on the basis of histogram data created from each image. Further, when such the images are used for detecting suspicious regions, sometimes, the variations of the gradation characteristics affect the detecting capability of the apparatus.

In addition, when the images acquired on the different conditions are classified corresponding to the involution degree of mammary glands, sometimes, it has been difficult to obtain accurate and stable classification results, due to the variations of the gradation characteristics.

SUMMARY OF THE INVENTION

To overcome the abovementioned drawbacks in conventional radiation image processing apparatus, it is an object of the present invention to provide a radiation image processing apparatus and a cassette for storing a radiation image, which make it possible to read the radiation images, which were acquired on the different conditions, in a constant and stable gradation.

Accordingly, to overcome the cited shortcomings, the abovementioned object of the present invention can be attained by radiation image processing apparatus described as follow.

(1) An apparatus for processing a radiation image, comprising: a pixel-value analyzing section to analyze a pixel-value within a step pattern of a wedge area in which a density varies step by step, wherein the radiation image includes the wedge area; and a suspicious region analyzing section to detect a candidate of a suspicious region by using information outputted from the pixel-value analyzing section.

(2) The apparatus of item 1, wherein the suspicious region analyzing section comprises a gradation-adjusting section to adjust a gradation of the radiation image on the basis of information, pertaining to the pixel-value, outputted by the pixel-value analyzing section.

(3) The apparatus of item 1, wherein the suspicious region analyzing section comprises a parameter-adjusting section to adjust a parameter for detecting the candidate of the suspicious region on the basis of information, pertaining to the pixel-value, outputted by the pixel-value analyzing section.

(4) The apparatus of item 2, further comprising: a first suspicious region detecting section to detect the candidate of the suspicious region on the basis of the radiation image, the gradation of which is adjusted by the gradation-adjusting section.

(5) The apparatus of item 3, further comprising: a second suspicious region detecting section to detect the candidate of the suspicious region by using the parameter adjusted by the parameter-adjusting section.

(6) The apparatus of item 4, further comprising: an image-outputting section to output the radiation image, the gradation of which is adjusted by the gradation-adjusting section.

(7) The apparatus of item 4, further comprising: an outputting section to output both a result of detecting the suspicious region in the first suspicious region detecting section and the radiation image adjusted by the gradation-adjusting section.

(8) The apparatus of item 5, further comprising: an outputting section to output both a result of detecting the suspicious region in the second suspicious region detecting section and the radiation image adjusted by the gradation-adjusting section.

(9) The apparatus of item 1, further comprising: a step position-detecting device for detecting a step position of the wedge area on the basis of a feature of a change amount of pixel-values; wherein a region of interest is determined on the basis of the step position detected by the step position-detecting device.

(10) The apparatus of item 9, wherein the step position-detecting device finds an area, at which the pixel value varies step by step, by obtaining profiles at a plurality of positions in plural directions to recognize the step position.

(11) The apparatus of item 2, further comprising: an image-outputting section to output the radiation image, the gradation of which is adjusted by the gradation-adjusting section.

(12) The apparatus of item 2, wherein the radiation image is a mammography, further comprising: an image-classifying section to classify the mammography, the gradation of which adjusted by the gradation-adjusting section, corresponding to a degree of involution of mammary glands.

(13) The apparatus of item 8, further comprising: a gradation-adjusting section; wherein the outputting section outputs the radiation image, the gradation of which is adjusted by the gradation-adjusting section.

(14) The apparatus of item 8, further comprising: a step position-detecting device for detecting a step position of the wedge area on the basis of a feature of a change amount of pixel-values; wherein a region of interest is determined on the basis of the step position detected by the step position-detecting device.

(15) The apparatus of item 8, wherein the radiation image is a mammography, further comprising: an image-classifying section to classify the mammography, the gradation of which adjusted by the gradation-adjusting section, corresponding to a degree of involution of mammary glands.

(16) The apparatus of item 6, wherein the image-outputting section outputs at least one of a voltage applied to a radiation tube, a mAs value, a kind of an added filter, a kind of a radiation tube, a thickness of a focal point size, a compressing pressure, an enlarging rate and a tilt angle onto a partial area of the radiation image, on which a subject image does not overlap.

(17) The apparatus of item 15, wherein the outputting section outputs at least one of a voltage applied to a radiation tube, a mAs value, a kind of an added filter, a kind of a radiation tube, a thickness of a focal point size, a compressing pressure, an enlarging rate and a tilt angle onto the mammography.

(18) The apparatus of item 4, wherein the suspicious region analyzing section comprises: a parameter-adjusting section to adjust a parameter for detecting the candidate of the suspicious region on the basis of information, pertaining to the pixel-value, outputted by the pixel-value analyzing section; and a second suspicious region detecting section to detect the candidate of the suspicious region by using the parameter adjusted by the parameter-adjusting section.

Further, to overcome the abovementioned problems, other radiation image processing Apparatus, embodied in the present invention, will be described as follow:

(19) A radiation image processing apparatus, characterized by comprising:

pixel-value analyzing means for analyzing a pixel-value of a wedge area of a radiation image, which includes a wedge in which a density varies step by step;

gradation-adjusting means for adjusting a gradation of the radiation image on the basis of information of the pixel-value obtained from the pixel-value analyzing section; and suspicious region detecting means for detecting a candidate of a suspicious region by using the radiation image, the gradation of which is adjusted by the gradation-adjusting means.

According to the configuration mentioned above, since it is possible to adjust the subject images at a stable gradation irrespective of individualities of the subjects, it becomes possible to detect suspicious regions without being affected by each of the gradation characteristics of the images.

(20) A radiation image processing apparatus, characterized by comprising:

pixel-value analyzing means for analyzing a pixel-value of a wedge area of a radiation image, which includes a wedge in which a density varies step by step;

gradation-adjusting means for adjusting a gradation of the radiation image on the basis of information of the pixel-value obtained from the pixel-value analyzing section; and image-outputting means for outputting the radiation image, the gradation of which is adjusted by the gradation-adjusting means.

According to the configuration mentioned above, since it is possible to adjust the subject images at a stable gradation irrespective of individualities of the subjects, it becomes possible to output the images having a stable gradation.

(21) A radiation image processing apparatus, characterized by comprising:

pixel-value analyzing means for analyzing a pixel-value of a wedge area of a radiation image, which includes a wedge in which a density varies step by step;

suspicious region detecting parameter adjusting means for adjust a parameter for detecting a candidate of a suspicious region on the basis of information of the pixel-value, obtained from the pixel-value analyzing means.

suspicious region detecting means for detecting the candidate of the suspicious region by using the parameter adjusted by the suspicious region detecting parameter adjusting means.

According to the configuration mentioned above, since varying factors, which adversely affect the detecting action of the candidate of the suspicious region due to the variation of gradations of the radiation images, can be suppressed, it becomes possible to stabilize the detecting results of the suspicious regions.

(22) A radiation image processing apparatus, characterized by comprising:

pixel-value analyzing means for analyzing a pixel-value of a wedge area of a mammography, which includes a wedge in which a density varies step by step;

gradation-adjusting means for adjusting a gradation of the radiation image on the basis of information of the pixel-value obtained from the pixel-value analyzing section; and image-classifying means for classifying the image corresponding to a degree of involution of mammary glands by using the image adjusted by the gradation-adjusting means.

According to the configuration mentioned above, since the breast images, each gradation of which is adjusted, can be classified into a plurality of categories corresponding to the degree of involution of mammary glands without being affected by the differences between gradations of the breast images, it becomes possible to help the image diagnosis.

(23) A radiation image processing apparatus, characterized in that, suspicious region detecting results detected according to item 19 and item 21 is outputted with the image adjusted according to item 20.

According to the configuration mentioned above, it becomes possible not only to stabilize the detecting results of the suspicious regions, but also to confirm the outputted images in a condition of the favorable gradation, resulting in improvement of the efficiency of making diagnosis.

(24) The radiation image processing apparatus recited in any one of items 19–23, characterized by further comprising:

step position-recognizing means for recognizing a step position of the wedge on the basis of a feature of a change amount of pixel-values;

wherein a region of interest is determined on the basis of the step position detected by the step position-recognizing means.

According to the configuration mentioned above, even when the apparatus does not recognize the step position of the wedge area in advance, it is possible to recognize the step position and to determine a region of interest (ROI) from the step position.

(25) The radiation image processing apparatus recited in item 24, characterized in that, the step position-detecting means finds an area, at which the pixel value varies step by step, by obtaining profiles at a plurality of positions in plural directions to recognize the step position.

According to the configuration mentioned above, it is possible to recognize the step position by obtaining profiles at a plurality of positions in plural directions.

(26) The radiation image processing apparatus recited in item 20 or item 23, characterized in that, when outputting to the outputting means, one or a plurality of a voltage applied to a radiation tube, a mAs value, a kind of an added filter, a kind of a radiation tube, a thickness of a focal point size, a compressing pressure, an enlarging rate and a tilt angle is/are outputted to a position at which a subject image does not overlap.

According to the configuration mentioned above, it becomes possible to utilize the information at the time of acquiring the radiation image for making diagnosis, resulting in improvement of efficiency of making diagnosis.

(27) The radiation image processing apparatus recited in item 20 or item 23, characterized in that, when the radiation image is a mammography, one or a plurality of a voltage applied to a radiation tube, a mAs value, a kind of an added filter, a kind of a radiation tube, a thickness of a focal point size, a compressing pressure, an enlarging rate and a tilt angle is/are outputted.

According to the configuration mentioned above, it becomes possible to utilize the information at the time of acquiring the breast image for making diagnosis, resulting in improvement of efficiency of making diagnosis.

(28) A cassette for storing a radiation image, characterized by comprising:

a wedge in which a density varies step by step, wherein the wedge is equipped at a part of the cassette.

According to the configuration mentioned above, when the wedge is equipped in the interior of the cassette, it becomes possible to prevent the wedge from being left, and it becomes convenient to convey the cassette. Further, since the projected position of the wedge can be specified every time, the wedge area can be easily recognized.

BRIEF DESCRIPTION OF THE DRAWINGS

Other objects and advantages of the present invention will become apparent upon reading the following detailed description and upon reference to the drawings in which:

FIG. 2(a) shows a cross-sectional view of the wedge, while FIG. 2(b) shows an X-ray image of the wedge;

DETAILED DESCRIPTION OF THE PREFERRED EMBODIMENT

Figure 1:
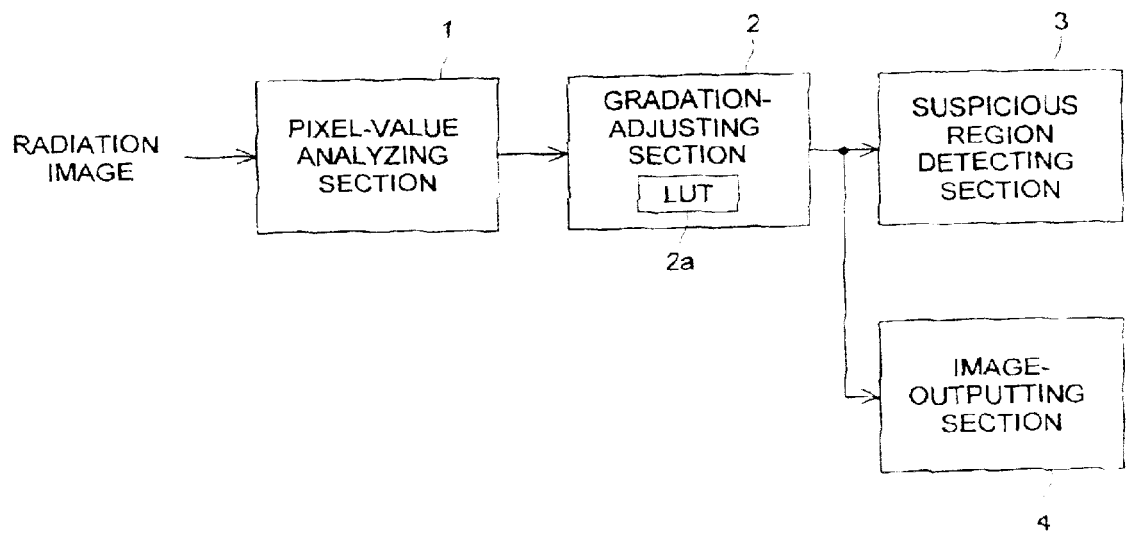
FIG. 1 shows a block-diagram of an exemplified embodiment of the present invention.

Referring to the drawings, the embodiment of the present invention will be detailed in the following.

FIG. 1 shows a block-diagram of an exemplified embodiment of the present invention. This embodiment is an example, which includes a pixel-value analyzing section and a suspicious region detecting section. The configuration, in which the suspicious region detecting section further includes a gradation-adjusting section and a suspicious region detecting section, will be detailed in the following.

In FIG. 1, numeral 1 indicates a pixel-value analyzing section for analyzing pixel-values of the wedge area in which the density varies step by step, and which is included in a radiation image. Numeral 2 indicates a gradation-adjusting section for adjusting the gradation of the radiation image on the basis of information, pertaining to the pixel-value, outputted by pixel-value analyzing section 1. Numeral 2a indicates a LUT (Look Up Table: detailed later) stored in gradation-adjusting section 2. Numeral 3 indicates a suspicious region detecting section for detecting a candidate of a suspicious region by using the images, the gradation of which is adjusted by gradation-adjusting section 2. Numeral 4 indicates an image-outputting section for outputting the image based on the image data outputted by gradation-adjusting section 2. For instance, a CRT, a printer for printing images on a film, a printer for printing images on a paper, a host-computer, an image storing apparatus, etc., can be employed as image-outputting section 4. Operations of the abovementioned apparatus will be detailed in the following.

The precondition of the present invention is to equip a wedge scale, by which stepwise variation of the density can be formed on a film or a plate, onto a cassette incorporating such the film or the plate.

Figure 2:
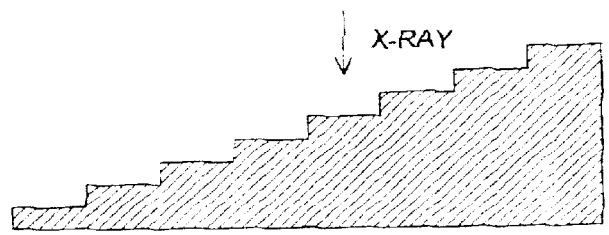
FIG. 2(a) and FIG. 2(b) show explanatory illustration of a wedge.
Figure 2:

FIG. 2(a) and FIG. 2(b) show explanatory illustration of the wedge. FIG. 2(a) shows a cross-sectional view of the wedge and FIG. 2(b) shows an X-ray image of the wedge. The wedge is so constituted that its thickness varies step by step from a thin region to a thick region in its longitudinal direction. The wedge is equipped on an appropriate position of a cassette for acquiring the X-ray image of the subject. The X-ray image at the thin region of the wedge becomes dark, since most of the X-rays can penetrate through the thin region of the wedge. On the other hand, the thicker the wedge is, the whiter the X-ray image of the wedge becomes, since the thicker the wedge is, the less the X-rays penetrate through the wedge. As a result, the X-ray image at the thickest region of the wedge exhibits the low-density optical luminance (a high-luminance). Reference values, each of which corresponds to image data of each step, are stored in advance in the apparatus, so as to obtain the most appropriate gradation. Further, the apparatus recognizes in advance each position of the steps in the wedge. Still further, it is possible to control the X-ray penetration rate of the wedge not only by changing the thickness of the wedge but also by changing the density of the substance, for instance, calcium phosphate, included in the wedge.

Further, it is desirable that the wedge is equipped at a lower position onto which the X-ray image of the subject is possibly not projected, considering an objective part of the body, or it is also possible that the wedge is put on a radiographic plate, so as not to overlap with the subject.

Alternatively, when the wedge is equipped in the interior of the cassette, it becomes possible to prevent the wedge from being left on the radiographic plate, and it becomes convenient to convey the cassette. Further, since the projected position of the wedge can be specified every time, the wedge area can be easily recognized.

FIG. 3(a) and FIG. 3(b) show a radiation image to be inputted into pixel-value analyzing section 1. In FIG. 3(a), numeral 10 indicates a wedge image, and numeral 11 indicates a subject image, for which a breast is exemplified hereinafter. A radiation image shown in FIG. 3(b) is the same image as that shown in FIG. 3(b) except that it is rotated at 90 degree. To form the abovementioned radiation image, the image data obtained by digitizing the film image, captured and developed by the film-screen system, are utilized in the screen-file system, while the image data inputted from the inputting device are utilized in the digital system.

(Image Adjustment)

Pixel-value analyzing section 1 calculates each of the stepwise pixel values for every step at the wedge area. It is assumed that the apparatus recognizes the position of each step in advance. In case of the mammography, it is desirable that the wedge area is located opposite the chest wall, while, in case of the chest part, it is desirable that the wedge area is located at the upper portion of the shoulder or in the vicinity of right or left side of the body.

When the apparatus does not recognize the step position of the wedge area in advance, a step position-detecting device is provided for detecting the step position of the wedge area on the basis of change amounts of the pixel-values. Then, it is possible to determine a region of interest (hereinafter, referred to as a ROI) from the step position detected by the step position-detecting device.

In the above case, the step position-detecting device can recognize the step position by obtaining a profile at an arbitral position and finding such an area that the pixel value of the area varies step by step. According to this method, the step position can be recognized by the profile obtained at a certain position.

Alternatively, the step position-detecting device can recognize the step position by obtaining profiles at a plurality of positions in plural directions and finding such an area that the pixel value of the area varies step by step. According to this method, the step position can be recognized by the profiles obtained at a plurality of positions.

For instance, it is applicable that the profiles in different directions (for instance, inclined at every 30 degree) are calculated at a plurality of positions to find an area at which the pixel value varies step by step, and then, the ROI corresponding to each step is determined on the basis of the pixel value at each of the steps.

Further, the ROI is established in every step, and representative values of the ROI (for instance, an average value, a median value, a most frequent value, a pixel value at a certain position in the ROI) are calculated to set central values of its step. The gradation-adjusting section correlates the pixel value of each step with the predetermined pixel value stored in advance to create a lookup table (hereinafter, referred to as a LUT) and to adjust the pixel values of the whole image.

Figures 4, 5:
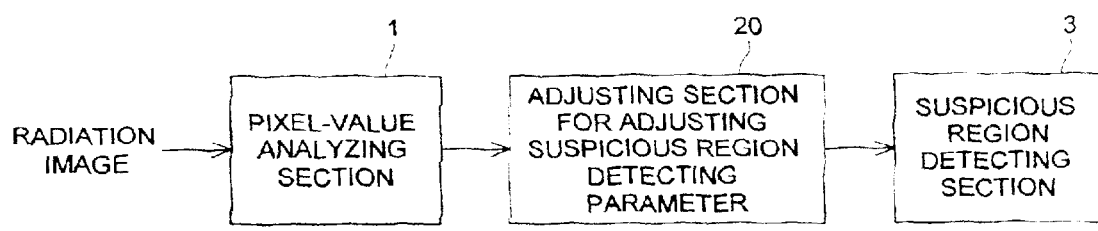
FIG. 4 shows a LUT (Look Up Table)
FIG. 5 shows a block-diagram of another embodiment of the present invention.
Figure 6A:
FIG. 6(a), FIG. 6(b), FIG. 6(c) and FIG. 6(d) show exemplified radiation images of mammary glands, which are classified on the basis of the density of mammary glands and displayed as halftone photographic-images on the screen of the displaying apparatus embodied in the present invention.
Figure 6B:
Figure 6C:
Figure 6D:

FIG. 4 shows a structure of the LUT, in which D1–Dn indicate the pixel values found by conducting the abovementioned processes, while A1–An indicate the predetermined pixel-values stored in advance. For this LUT, the number of steps is "n", and the LUT shown in FIG. 4 implies that the pixel-value of D1 is substituted by the pixel-value of A1, the pixel-value of D2 is substituted by the pixel-value of A2, . . . , and the pixel-value of Dn is substituted by the pixel-value of An.

With the abovementioned structure of the LUT, when the density of the subject image is measured, the gradation converting operation is conducted by using the predetermined pixel-values stored in advance, as the image density corresponding to the measured pixel-value of each of the steps. According to the present invention, the gradation converting operation of the density of the subject image is conducted by employing the LUT shown in FIG. 4. As a result, either the image being dark as a whole or the image being bright as a whole can be converted into the image having an appropriate brightness. In other words, according to the present invention, since it is possible to maintain a consistent gradation irrespective of individualities of the subjects by adjusting the gradation of the subject images, it becomes possible to detect suspicious regions without being affected by each of the gradation characteristics of the images.

Specifically, with respect to the gradation-converting processing of radiation images, it has been a problem that gradations of radiation images, acquired in different facilities, vary with each of the facilities. It is a feature of the present invention, however, that the radiation images acquired in any facilities can be converted into the images having a constant gradation.

Further, suspicious region detecting section 3 detects a candidate of the suspicious region from the image, the gradation of which is converted in advance by using LUT 2a in gradation-adjusting section 2. According to the present invention, since it is possible to convert the radiation images acquired on any conditions to the images having a constant gradation, it becomes possible to precisely detect a candidate of the suspicious region.

Still further, according to the present invention, even for the radiation images, which are acquired on different conditions and gradations of which are adjusted by gradation-adjusting section 2, it is possible that image-outputting section 4 outputs the images having a constant gradation. In addition, since the images can be adjusted at a stable gradation irrespective of the individualities of the subjects, it becomes possible to output the images having a stable gradation.

When outputting the radiation image, one or a plurality of conditions, on which the radiation image is generated, including, for instance, a voltage applied to the radiation tube, a mAs value, a kind of an added filter, a kind of the radiation tube, a thickness of the focal point size, a compressing pressure, an enlarging rate and a tilt angle, is/are also outputted onto an area where no subject image exist. Then, it becomes possible for the doctor to utilize the information at the time of acquiring the radiation image for making diagnosis, resulting in improvement of efficiency of making diagnosis.

Further, when outputting the radiation image of a breast, one or a plurality of conditions, on Which the radiation image is generated, including a voltage applied to the radiation tuber a mAs value, a kind of the added filter, a kind of the radiation tube, a thickness of the focal point size, a compressing pressure, an enlarging rate and a tilt angle, is/are also outputted. Then, it becomes possible for the doctor to utilize the information at the time of acquiring the radiation image of the breast for making diagnosis, resulting in improvement of reliability of making diagnosis of the breast.

FIG. 5 shows a block-diagram of another embodiment of the present invention. The same block as that shown in FIG. 1 is denoted by the same numeral. This embodiment is an example, which includes an adjusting section for adjusting a suspicious region detecting parameter and a suspicious region analyzing section. The configuration, which further includes a suspicious region detecting-adjusting section and a suspicious region detecting section, will be detailed in the following.

In FIG. 5, numeral 1 indicates a pixel-value analyzing section for analyzing pixel-values of the wedge area in which the density varies stepwise, and which is included in a radiation image. Numeral 20 indicates an adjusting section for adjusting a suspicious region detecting parameter, which is utilized for detecting a candidate of a suspicious region on the basis of the pixel-values outputted by pixel-value analyzing section 1. Numeral 3 indicates a suspicious region detecting section for detecting a candidate of a suspicious region by using the parameters adjusted by adjusting section 20. Operations of the abovementioned apparatus will be detailed in the following.

(Adjustment of the Parameter for Detecting Suspicious Regions)

Figure 3:
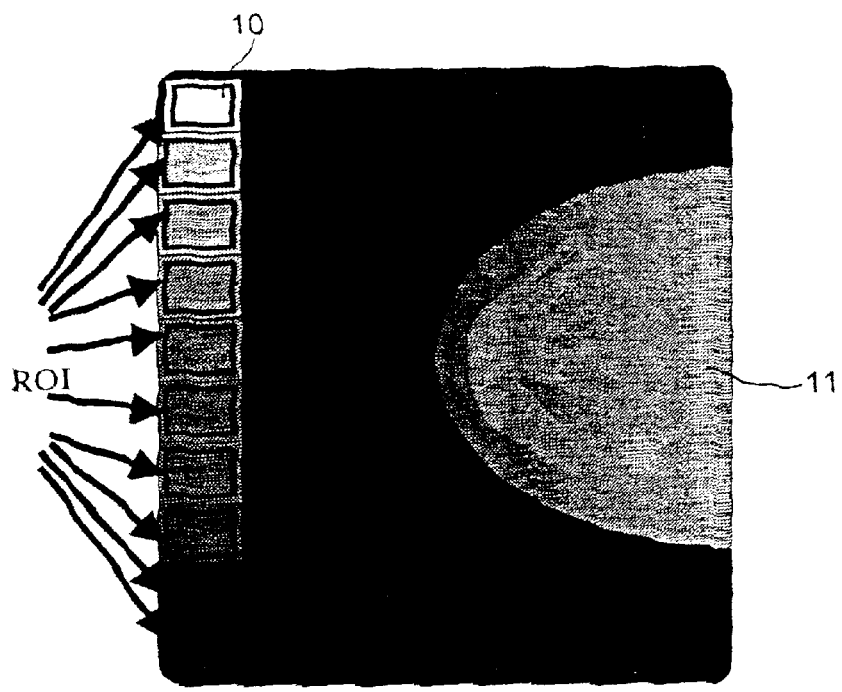
FIG. 3(a) and FIG. 3(b) show a radiation image to be inputted into a pixel-value analyzing section, and a radiation image shown in FIG. 3(b) is the same image as that shown in FIG. 3(b) except that it is rotated at 90 degree.
Figure 3:
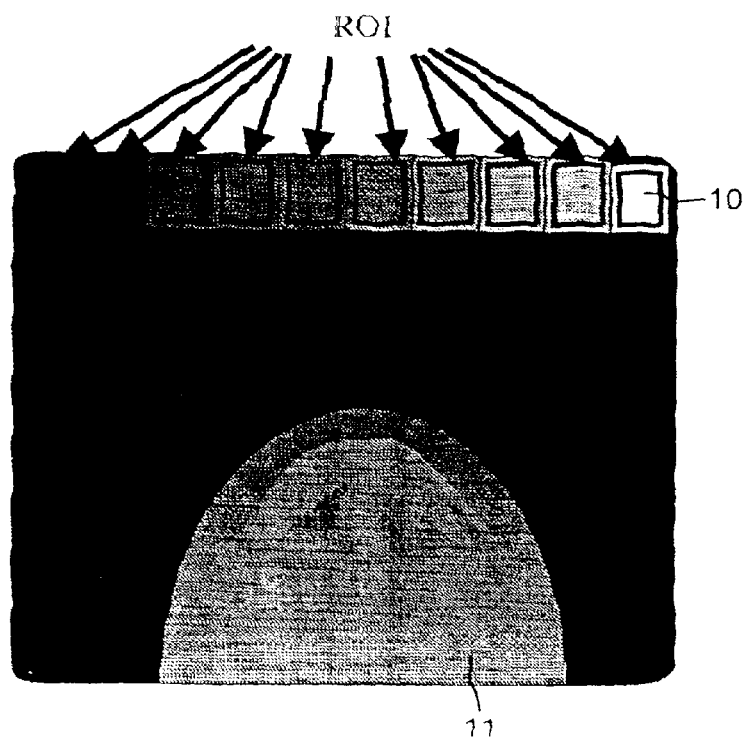

Pixel-value analyzing section 1 calculates the pixel-value in respect to every step of the wedge area, which varies step by step as shown in FIG. 3. For this purpose, the apparatus recognizes the position of each step in advance (it is desirable that the position does not overlap with the subject image).

Then, a ROI (Region Of Interest) is established in every step to calculate featuring-values in the ROI (including, for instance, average value, median value, maximum frequent value), which is defined as a pixel-value of the step.

Adjusting section 20, for adjusting a suspicious region detecting parameter, adjusts the suspicious region detecting parameter by utilizing the pixel-value at every step, which is found in the abovementioned process. Considering the nature of the featuring-values in regard to the featuring-values utilized for detecting a suspicious region and the featuring-values for deleting a false-positive candidate out of the detected candidates of the suspicious regions, adjusting section 20 determines the suspicious region detecting parameter, which reflects the pixel-values of the steps found through the abovementioned process. For instance, when calculating a contrast between inside and outside of the detected suspicious region, adjusting section 20 determines the threshold of the contrast by correlating the pixel-values in the vicinity of the detected suspicious region with the pixel-values of the steps.

According to the above embodiment, since varying factors, which adversely affect the detecting action of the candidate of the suspicious region due to the variation of gradations of the radiation images, can be suppressed, it becomes possible to stabilize the detecting results of the suspicious regions.

According to the present invention, both the gradation adjusted image according as the process of the embodiment shown in FIG. 1 and the result of detecting the suspicious region according as the process of the other embodiment shown in FIG. 5 can be outputted by image-outputting section 4. With this configuration, it becomes possible not only to stabilize the detecting results of the suspicious regions, but also to confirm the outputted images in a condition of the favorable gradation, resulting in improvement of the efficiency of making diagnosis.

It is possible that the radiation image and the result of detecting the suspicious region are outputted onto, for instance, a paper or a film in a state of overlapping each other. Further, it is also possible that two of the same images are outputted onto one sheet without overlapping each other, wherein one of the images is the gradation-adjusted image and the other is the gradation-adjusted image with the result of detecting the suspicious region. Still further, it is also applicable that the images, each gradation of which is separately adjusted, are outputted onto a film, while the gradation-adjusted image and the result of detecting the suspicious region are outputted onto a paper.

According to the other embodiment of the present invention, it becomes possible to stably classify the radiation images corresponding to the degree of involution of mammary glands by utilizing the images, each gradation of which is adjusted by using the wedge scale, even if the conditions of acquiring the radiation images vary between different medical-institutions. Incidentally, the term of "involution of mammary glands" means that the mammary glands gradually shrink with the increase of the age and are getting smaller in its size.

FIG. 6(*a*), FIG. 6(*b*), FIG. 6(*c*) and FIG. 6(*d*) show exemplified radiation images of mammary glands, which are classified on the basis of the density of mammary glands and displayed as grayscale images on the screen of the displaying apparatus embodied in the present invention. The image shown in FIG. 6(*a*) indicates a parenchymal pattern of the breast in which the involution of mammary glands has progressed and almost of the breast is replaced by the fatty tissue. Detection of a lesion would be easy, if the diseased part is projected within an image-acquiring region. The image shown in FIG. 6(b) indicates a mammary glands diffuseness in a fatty breast in which mammary glands are scattered. In this case, detection of a lesion is comparatively easy. The image shown in FIG. 6(c) indicates a non-uniformity of high-density mammary glands of a breast in which the fatty substances mingle with the mammary glands in a non-uniform density. In this case, there is a fear that a lesion would be possibly hidden behind the normal mammary glands, resulting in misdetection of the lesion. The image shown in FIG. 6(d) indicates high-density mammary glands of a breast all over which mammary glands are formed. In this case, detection rate of a lesion is low. Although a breast of young female is apt to exhibit the image shown in FIG. 6(d), the involution of mammary glands has progressed with the increase of ages, and as a result, mammary glands have been hardly recognized in the breast as shown in FIG. 6(a).

When finding a ratio of an area of mammary glands to the whole breast area, it is possible to precisely classify the radiation images corresponding to the degree of involution of mammary glands, by utilizing the images, each gradation of which is adjusted, and by converting either the image being dark as a whole or the image being bright as a whole into the image having an appropriate brightness. Accordingly, since the breast images, each gradation of which is adjusted, can be classified into a plurality of categories corresponding to the degree of involution of mammary glands, it becomes possible to help the image diagnosis.

Incidentally, since each of the abovementioned embodiments are one of the examples embodied in the present invention, the scope of the present invention is not limited to the abovementioned embodiments.

According to the present invention, the following effects can be attained.

(1) Since it is possible to adjust the subject images at a stable gradation irrespective of individualities of the subjects, it becomes possible to detect suspicious regions without being affected by each of the gradation characteristics of the images.

(2) Since it is possible to adjust the subject images at a stable gradation irrespective of individualities of the subjects, it becomes possible to output the images having a stable gradation.

(3) Since varying factors, which adversely affect the detecting action of the candidate of the suspicious region due to the variation of gradations of the radiation images, can be suppressed, it becomes possible to stabilize the detecting results of the suspicious regions.

(4) Since the breast images, each gradation of which is adjusted, can be classified into a plurality of categories corresponding to the degree of involution of mammary glands without being affected by the differences between gradations of the breast images, it becomes possible to help the image diagnosis.

(5) It becomes possible not only to stabilize the detecting results of the suspicious regions, but also to confirm the outputted images in a condition of the favorable gradation, resulting in improvement of the efficiency of making diagnosis.

(6) Even when the apparatus does not recognize the step position of the wedge area in advance, it is possible to recognize the step position and to determine a region of interest (ROI) from the step position.

(7) It is possible to recognize the step position by obtaining profiles at a plurality of positions in plural directions.

(8) It becomes possible to utilize the information at the time of acquiring the radiation image for making diagnosis, resulting in improvement of efficiency of making diagnosis.

(9) It becomes possible to utilize the information at the time of acquiring the breast image for making diagnosis, resulting in improvement of efficiency of making diagnosis.

(10) When the wedge is equipped in the interior of the cassette, it becomes possible to prevent the wedge from being left, and it becomes convenient to convey the cassette. Further, since the projected position of the wedge can be specified every time, the wedge area can be easily recognized.

As mentioned in the above, according to the present invention, it becomes possible to provide a radiation image processing apparatus and a cassette for storing a radiation image, which make it possible to read the radiation images, which were acquired on the different conditions, in a constant and stable gradation.

Disclosed embodiment can be varied by a skilled person without departing from the spirit and scope of the invention.

What is claimed is:

1. An apparatus for processing a radiation image, comprising:

a pixel-value analyzing section to analyze pixel-values within a step pattern of a wedge area in said radiation image, said wedge area being an area in which a density varies step by step;

a suspicious region analyzing section to detect a candidate of a suspicious region using information outputted from said pixel value analyzing section; and a step position-detecting device for detecting a step position of said wedge area based on a feature of a change amount of the pixel-values;

wherein a region of interest is determined based on said step position detected by said step position-detecting device; and wherein said step position-detecting device obtains profiles at a plurality of positions in a plurality of directions to find an area at which said pixel-values vary step by step, to detect said step position.

2. The apparatus of claim 1, wherein said suspicious region analyzing section comprises a gradation-adjusting section to adjust a gradation of said radiation image based on the information outputted by said pixel-value analyzing section.

3. The apparatus of claim 2, further comprising a suspicious region detecting section to detect said candidate of said suspicious region based on said radiation image having said gradation which is adjusted by said gradation-adjusting section.

4. The apparatus of claim 3, further comprising an image-outputting section to output said radiation image having said gradation which is adjusted by said gradation-adjusting section.

5. The apparatus of claim 3, further comprising an outputting section to output both a result of detecting said suspicious region by said suspicious region detecting section and said radiation image having said gradation adjusted by said gradation-adjusting section.

6. The apparatus of claim 2, further comprising an image-outputting section to output said radiation image having said gradation which is adjusted by said gradation-adjusting section.

7. The apparatus of claim 2, wherein said radiation image is a mammography having said gradation adjusted by said gradation-adjusting section, and the apparatus further comprises an image-classifying section to classify said mammography based on a degree of involution of mammary glands.

8. The apparatus of claim 3, wherein said suspicious region analyzing section comprises a parameter-adjusting section to adjust a parameter for detecting said candidate of said suspicious region based on the information outputted by said pixel-value analyzing section; and
wherein the apparatus further comprises another suspicious region detecting section to detect said candidate of said suspicious region by using said parameter for detecting said candidate of said suspicious region, said parameter being adjusted by said parameter-adjusting section.

9. The apparatus of claim 1, wherein said suspicious region analyzing section comprises a parameter-adjusting section to adjust a parameter for detecting said candidate of said suspicious region based on the information outputted by said pixel-value analyzing section.

10. The apparatus of claim 9, further comprising a suspicious region detecting section to detect said candidate of said suspicious region using said parameter for detecting said candidate of said suspicious region, said parameter being adjusted by said parameter-adjusting section.

11. The apparatus of claim 10, wherein said suspicious region analyzing section comprises a gradation-adjusting section to adjust a gradation of said radiation image based on the information outputted by said pixel-value analyzing section; and
wherein the apparatus further comprises an outputting section to output both a result of detecting said suspicious region by said suspicious region detecting section and said radiation image having said gradation adjusted by said gradation-adjusting section.

12. An apparatus for processing a radiation image, comprising:
a pixel-value analyzing section to analyze pixel-values within a step pattern of a wedge area in said radiation image, said wedge area being an area in which a density varies step by step;
a suspicious region analyzing section to detect a candidate of a suspicious region using information outputted from said pixel value analyzing section, said suspicion region analyzing section comprising: (i) a parameter-adjusting section to adjust a parameter for detecting said candidate of said suspicious region based on the information outputted by said pixel-value analyzing section, and (ii) a gradation-adjusting section to adjust a gradation of said radiation image based on the information outputted by said pixel-value analyzing section;
a suspicious region detecting section to detect said candidate of said suspicious region using said parameter for detecting said candidate of said suspicious region, said parameter being adjusted by said parameter-adjusting section;
an outputting section to output both a result of detecting said suspicious region by said suspicious region detecting section and said radiation image having said gradation adjusted by said gradation-adjusting section; and
a step position-detecting device for detecting a step position of said wedge area based on a feature of a change amount of the pixel-values;
wherein a region of interest is determined based on said step position detected by said step position-detecting device.

13. An apparatus for processing a radiation image that is a mammography, said apparatus comprising:
a pixel-value analyzing section to analyze pixel-values within a step pattern of a wedge area in said radiation image, said wedge area being an area in which a density varies step by step;
a suspicious region analyzing section to detect a candidate of a suspicious region using information outputted from said pixel value analyzing section, said suspicion region analyzing section comprising: (i) a parameter-adjusting section to adjust a parameter for detecting said candidate of said suspicious region based on the information outputted by said pixel-value analyzing section, and (ii) a gradation-adjusting section to adjust a gradation of said radiation image based on the information outputted by said pixel-value analyzing section;
a suspicious region detecting section to detect said candidate of said suspicious region using said parameter for detecting said candidate of said suspicious region, said parameter being adjusted by said parameter-adjusting section;
an outputting section to output both a result of detecting said suspicious region by said suspicious region detecting section and said radiation image having said gradation adjusted by said gradation-adjusting section; and
an image-classifying section to classify said mammography having said gradation adjusted by said gradation-adjusting section, based on a degree of involution of mammary glands.

14. The apparatus of claim 13, wherein said outputting section outputs at least one of a voltage applied to a radiation tube, a mAs value, a kind of an added filter, a kind of a radiation tube, a thickness of a focal point size, a compressing pressure, an enlarging rate and a tilt angle onto said mammography.

15. An apparatus for processing a radiation image, comprising:
a pixel-value analyzing section to analyze pixel-values within a step pattern of a wedge area in said radiation image, said wedge area being an area in which a density varies step by step;
a suspicious region analyzing section to detect a candidate of a suspicious region using information outputted from said pixel value analyzing section, said suspicious region analyzing section comprising a gradation-adjusting section to adjust a gradation of said radiation image based on the information outputted by said pixel-value analyzing section;
a suspicious region detecting section to detect said candidate of said suspicious region based on said radiation image having said gradation which is adjusted by said gradation-adjusting section; and
an image outputting section to output said radiation image having said gradation which is adjusted by said gradation-adjusting section;
wherein said image-outputting section outputs at least one of a voltage applied to a radiation tube, a mAs value, a sec. value, a kind of an added filter, a kind of a radiation tube, a thickness of a focal point size, a compressing pressure, an enlarging rate and a tilt angle onto a partial area of said radiation image, on which a subject image does not overlap.

* * * * *